Oct. 10, 1961  W. S. DUNCAN  3,003,543
CHILD'S WALKER CONVERTIBLE TO A ROCKING CHAIR
Filed Feb. 19, 1960

INVENTOR
WILLIAM S. DUNCAN
BY
ATTORNEYS

United States Patent Office 3,003,543
Patented Oct. 10, 1961

3,003,543
CHILD'S WALKER CONVERTIBLE TO A
ROCKING CHAIR
William S. Duncan, Elora, Ontario, Canada
Filed Feb. 19, 1960, Ser. No. 9,780
4 Claims. (Cl. 297—130)

This invention relates to a child's vehicle and in particular to a combination vehicle which can be easily converted from a wheeled one into a rocking chair or vice versa.

A further object of the invention is to provide a child's combination vehicle, which is simple in construction, safe for a child to use and incorporates a feature that permits the length of the supporting legs of the vehicle being adjusted to suit children of different heights.

The construction and operation of the child's vehicle is set forth in the following description and illustrated in the accompanying drawings in which—

Figure 1:
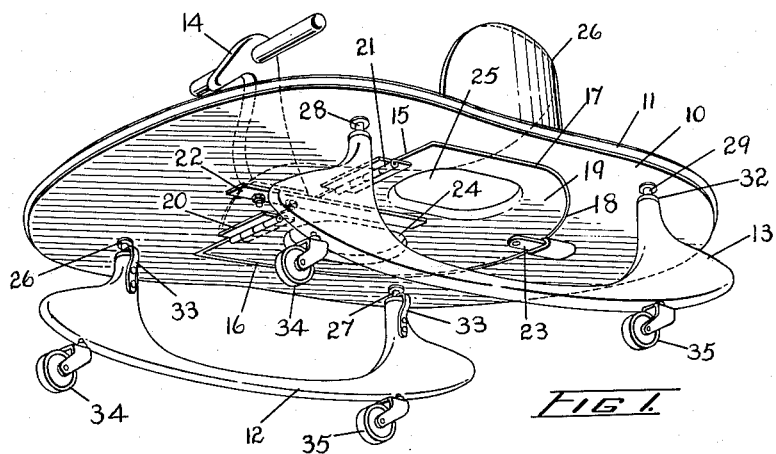
FIGURE 1 is a perspective view of the child's vehicle constructed according to the present invention and taken on an angle looking up towards the underside of the same.
Figure 2:
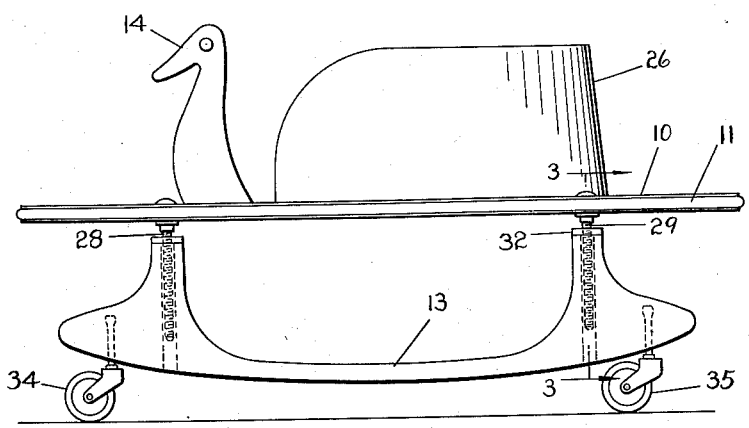
FIGURE 2 is a side elevation of the vehicle shown in FIGURE 1.

The child's vehicle illustrated in the drawings comprises a plate 10 having curved side edges which are covered with a rubber like protective moulding 11 serving as a bumper, a pair of rockers 12, 13, which are mounted on the underside of the plate 10 in the manner hereinafter described and a gripping handle 14 which is mounted perpendicularly on the front portion of the plate 10.

The plate 10 is formed with a large central opening defined by a substantially straight forward edge 15 substantially straight side edges 16, 17, and curved back edge 18 joined to the side edges. Mounted within the opening thus formed and filling the same is a seat 19 which, as will be seen, conforms to the shape of the said opening. The forward straight edge of the seat is hingedly connected to the plate 10 by hinges 20, 21. The space between the forward edge of the seat and the edge 15 is covered by a strip of rubber to prevent the child having a part of his body pinched therebetween.

A flat spring member 22 is secured to the underside of the plate and extends rearwardly under the seat to normally hold the seat in substantially the same plane as the plate. The seat is provided with a stop 23 which engages against the underside of the plate and prevents the spring moving the seat above the level of the plate. The seat 19 is formed with a pair of large openings 24, 25, preferably of elliptical shape, so that when the child is seated upon the seat, his legs will project through the openings and they can be moved freely therein when he is using his feet to push the vehicle along the floor of the room. The seat is also provided with a back rest 26.

The rockers 12, 13, are adjustably attached or fastened to the underside of the plate by means of legs 26, 27, 28 and 29, respectively. Each of the rockers 12 and 13 are formed with a pair of sockets extending downwardly into the rocker and positioned to register with the respective front and back legs, the legs 26, 27, 28 and 29 being inserted in their respective sockets and held therein in the following manner.

Figure 3:
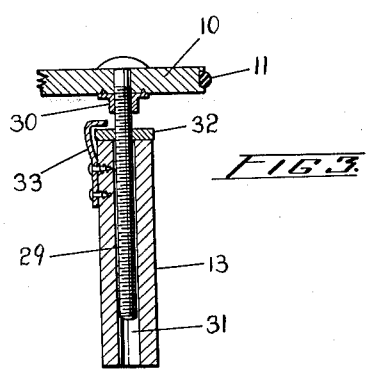
FIGURE 3 is a cross-sectional view taken on the line 3—3 of FIGURE 2.

As each socket is identical and the legs are identical the construction of the same will be described in conjunction with leg 29, shown in FIGURE 3. It will be seen that the leg 29, is in the form of a substantially long screw threaded bolt such as a carriage bolt which is inserted through the plate 10 and secured thereto by a nut 30. The socket 31 which is formed perpendicularly in the rocker 13, adjacent the back end, receives the leg 29 which is adjustably secured therein by a rotatable connecting member which in the illustrated construction comprises a nut 32 that is mounted on said leg. The nut 32 rests against the rim of the socket and is rotatably fastened to the rocker by means of a keeper 33 which is secured to the rocker, the keeper having a lip which overlies and engages against the nut 32 to hold it in place. By means of this arrangement, the relative length of the legs may be changed to either increase or decrease the length of the same as required by rotating the nuts 32 in the appropriate direction. As a consequence, the legs of the vehicle can be adjusted to suit children of different heights.

In the construction shown each of the rockers 12, 13, are provided with front and rear castors 34, 35, which are removably fastened to the bottom side of the rockers. To convert the vehicle to a rocker, the castors are removed by pulling the shank of the castors out of their sockets.

When the child is at the creeping age, the handle is removed so that the child can lie, stomach down, on the plate with his legs inserted through the openings 24, 25. The child can then push the vehicle along the floor.

What I claim as new and desire to protect by Letters Patent of the United States is:

1. In a child's walker, a plate; a substantially large central opening in the plate; a seat filling said opening and having its forward edge hingedly connected to the forward edge of said central opening, said seat having a pair of openings in side-by-side relation therethrough, said pair of openings being of a size that the legs of a child are freely movable therein; a flat spring member secured to the underside of the plate and extending rearwardly under the seat to normally hold said seat in substantially the same plane as the plate; a pair of front legs and a pair of back legs fastened to and extending downwardly from the underside of said plate; a pair of rockers, each rocker having a front and rear socket for receiving its respective front and back leg; and means for retaining the legs in said socket, said means comprising a threaded extension on each leg, a rotatable connecting member carried on said extension adjustably joining said member to said rocker adjacent said socket whereby on rotating said member the relative length of each leg may be varied, and castors removably mounted on the underside of the rockers.

2. A child's walker according to claim 1 in which the means rotatably interjoining the connecting member and the said rocker comprises a fastening device removably attached to the upper portion of the leg and a nut threaded onto said leg, said nut engaging against the socket rim and said fastening device having a lip which overlies said nut, whereby said nut and fastening device cooperate to retain said rocker in assembled position.

3. In a child's walker, a plate; a substantially large central opening in the plate having a straight forward edge and substantially straight sides joined by a circular rear edge; a seat filling said central opening and having its straight forward edge hingedly connected to the forward edge of said opening, said seat having a pair of openings in side-by-side relation therethrough, said pair of openings being of a size that the legs of a child are freely movable therein; a flat spring member secured to the underside of the plate and extending rearwardly under the seat to normally hold said seat in substantially the same plane as the plate; a pair of front legs and a pair of back legs fastened to and extending downwardly from the underside of said plate; a pair of rockers, each rocker having a front and rear socket for receiving its respective front and back leg; and means for retaining the legs in said socket, said means comprising a threaded extension on each leg, a rotatable connecting member carried on said extension adjustably joining said member to said rocker adjacent said socket whereby on rotating said member the relative length of each leg may be varied, and castors removably mounted on the underside of the rockers.

4. A child's walker according to claim 3 in which the means rotatably interjoining the connecting member and the said rocker comprises a fastening device removably attached to the upper portion of the leg and a nut threaded onto said leg, said nut engaging against the socket rim and said fastening device having a lip which overlies said nut, whereby said nut and fastening device cooperate to retain said rocker in assembled position.

References Cited in the file of this patent

UNITED STATES PATENTS

| | | |
|---|---|---|
| 529,359 | Bradish | Nov. 20, 1894 |
| 864,374 | Honig | Aug. 27, 1907 |
| 1,872,216 | Appleby | Aug. 16, 1932 |
| 2,415,146 | Nanna | Feb. 4, 1947 |
| 2,797,738 | Patterson | July 2, 1957 |